United States Patent
Kim et al.

(10) Patent No.: US 10,802,311 B2
(45) Date of Patent: Oct. 13, 2020

(54) DISPLAY DEVICE

(71) Applicant: LG Display Co., Ltd., Seoul (KR)

(72) Inventors: Kyoung-Jae Kim, Gumi-si (KR); Woo-Seok Cho, Daegu (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 16/216,673

(22) Filed: Dec. 11, 2018

(65) Prior Publication Data
US 2019/0196250 A1    Jun. 27, 2019

(30) Foreign Application Priority Data
Dec. 21, 2017  (KR) .......................... 10-2017-0177132

(51) Int. Cl.
| | | |
|---|---|---|
| *G02F 1/1333* | (2006.01) | |
| *F21V 8/00* | (2006.01) | |
| *G02F 1/1335* | (2006.01) | |
| *G02F 1/13357* | (2006.01) | |

(52) U.S. Cl.
CPC ..... *G02F 1/133308* (2013.01); *G02B 6/0051* (2013.01); *G02B 6/0073* (2013.01); *G02B 6/0088* (2013.01); *G02F 1/133615* (2013.01); *G02F 2001/133314* (2013.01); *G02F 2001/133317* (2013.01); *G02F 2001/133322* (2013.01); *G02F 2001/133507* (2013.01); *G02F 2201/46* (2013.01); *G02F 2202/28* (2013.01); *G02F 2203/02* (2013.01)

(58) Field of Classification Search
CPC ............ G02F 2201/46; G02F 2202/28; G02F 1/133308; G02F 1/133615; G02F 2001/13322; G02F 2001/133314; G02F 2001/133317; G02B 6/0051; G02B 6/0073; G02B 6/0088; G02B 6/009; G02B 6/0011; G02B 6/0055
See application file for complete search history.

(56) References Cited

U.S. PATENT DOCUMENTS

| | | | | |
|---|---|---|---|---|
| 8,243,223 B2* | 8/2012 | Lee | .................. | G02F 1/133308 349/58 |
| 2012/0268868 A1* | 10/2012 | Yoon | ................. | G02F 1/133308 361/679.01 |
| 2016/0170130 A1* | 6/2016 | Jin | ....................... | G02B 6/0055 349/65 |

* cited by examiner

*Primary Examiner* — Angela K Davison
(74) *Attorney, Agent, or Firm* — Fenwick & West LLP

(57) ABSTRACT

Disclosed is a display device configured such that a fixing unit is provided in an empty space between a liquid crystal panel and a light guide plate of a backlight unit in order to support the liquid crystal panel together with a mold and to fix an optical sheet and such that the fixing unit is provided with a reflection member in order to improve luminance at a light-incident part of the light guide plate, whereby image quality is improved.

5 Claims, 3 Drawing Sheets

DISPLAY DEVICE

CROSS-REFERENCE TO RELATED APPLICATIONS

This application claims the benefit of Republic of Korea Patent Application No. 10-2017-0177132, filed on Dec. 21, 2017, which is hereby incorporated by reference in its entirety.

BACKGROUND

Field of Technology

The present disclosure relates to a display device including a liquid crystal panel and a backlight unit.

Discussion of the Related Art

Recently, in the information-oriented society, the importance of display devices as visual information transmission media has been further emphasized. In order to occupy important positions in the future, requirements such as low power consumption, slimness, reduction in weight, and high image quality must be satisfied.

Display devices may be classified into self-emissive display devices, such as a cathode ray tube (CRT) display device, an electro luminescence (EL) display device, a light-emitting diode (LED) display, a vacuum fluorescent display (VFD) device, a field emission display (FED) device, and a plasma display panel (PDP), and non-emissive display devices, such as a liquid crystal display (LCD) device.

Of such display devices, the liquid crystal display device, which is a device that displays images using optical anisotropy of liquid crystals, has attracted attention, since the liquid crystal display device exhibits higher visibility, lower power consumption, and dissipation of a smaller amount of heat than a cathode ray tube display device that is the same size as the liquid crystal display device.

The liquid crystal display device is an image display device in which a light source is disposed under liquid crystals and in which an electric field is applied to the liquid crystals in order to control the arrangement of the liquid crystals, thereby adjusting the transmittance of light emitted from the light source. The liquid crystal display device is applied to various kinds of electronic equipment, such as smartphones and tablet PCs. In particular, the liquid crystal display device includes a liquid crystal panel disposed under a cover glass, a backlight unit disposed under the liquid crystal panel, and a guide panel for accommodating or supporting the liquid crystal panel or the backlight unit.

However, heat generated from a driving circuit provided in the liquid crystal panel and from the light source is concentrated in a region of the display device that is adjacent to the driving circuit and the light source. Consequently, there is an urgent necessity for heat dissipation. To this end, a LED flexible printed circuit board (FPCB) is disposed toward a cover bottom in order to discharge heat emitted from the light source to the outside. However, an empty step is formed in a portion of the space between the liquid crystal panel and the backlight unit. The force of supporting the liquid crystal panel is reduced and the structure for supporting an optical sheet is omitted due to the step.

SUMMARY

Accordingly, the present disclosure is directed to a display device that substantially obviates one or more problems due to the limitations and disadvantages of the related art.

An object of the present disclosure is to provide a display device including a fixing unit for compensating for a step formed in an empty space between a liquid crystal panel and a backlight unit and fixing an optical sheet.

Another object of the present disclosure is to provide a display device configured such that a fixing unit reflects a portion of the light emitted from a light source on the upper surface of a light guide plate, thereby improving luminance at a light-incident part of the light guide plate.

Additional advantages, objects, and features of the invention will be set forth in part in the description which follows and in part will become apparent to those having ordinary skill in the art upon examination of the following, or may be learned from practice of the invention. The objectives and other advantages of the invention may be realized and attained by the structure particularly pointed out in the written description and claims hereof as well as the appended drawings.

To achieve these objects and other advantages and in accordance with the purpose of the disclosure, as embodied and broadly described herein, a display device includes a fixing unit provided in an empty space between a liquid crystal panel and a backlight unit for supporting the liquid crystal panel together with a mold and fixing an optical sheet.

The fixing unit may include a reflection member for improving luminance at a light-incident part of a light guide plate, thereby improving image quality.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
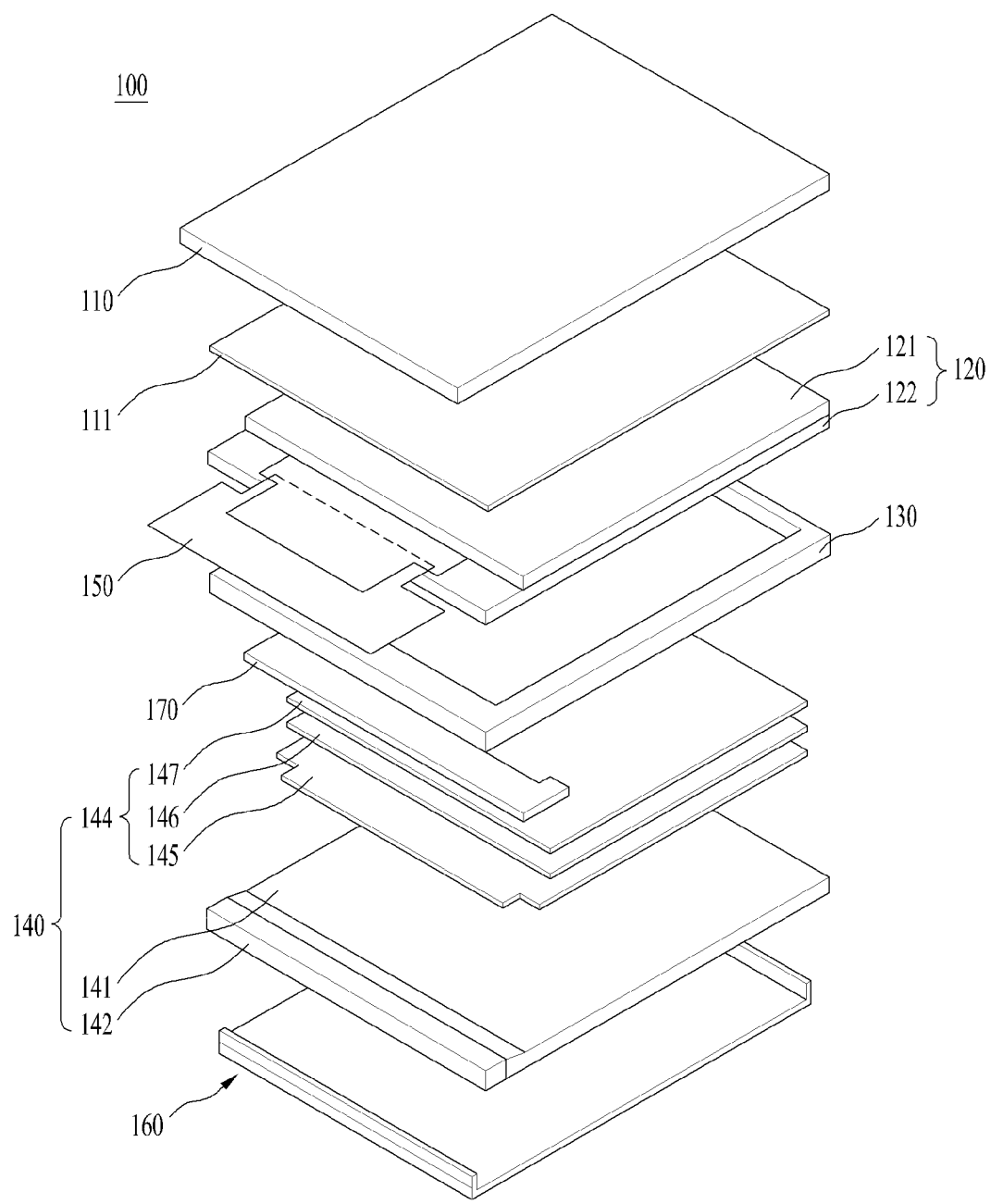
FIG. 1 is an exploded perspective view showing a display device according to an embodiment of the present disclosure.

Hereinafter, exemplary embodiments of an organic light-emitting display device according to the present disclosure will be described in detail with reference to the accompanying drawings so that the present invention will be easily realized by those skilled in the art. In the drawings, the same elements are denoted by the same reference numerals even when they are depicted in different drawings. In the following description of the present invention, a detailed description of known functions and configurations incorporated herein will be omitted when the same may obscure the subject matter of the present invention. Those skilled in the art will appreciate that some features in the drawings may be exaggerated, reduced, or simplified for ease of description thereof, and that drawings and elements thereof are not always shown at the accurate scale.

Figure 2:
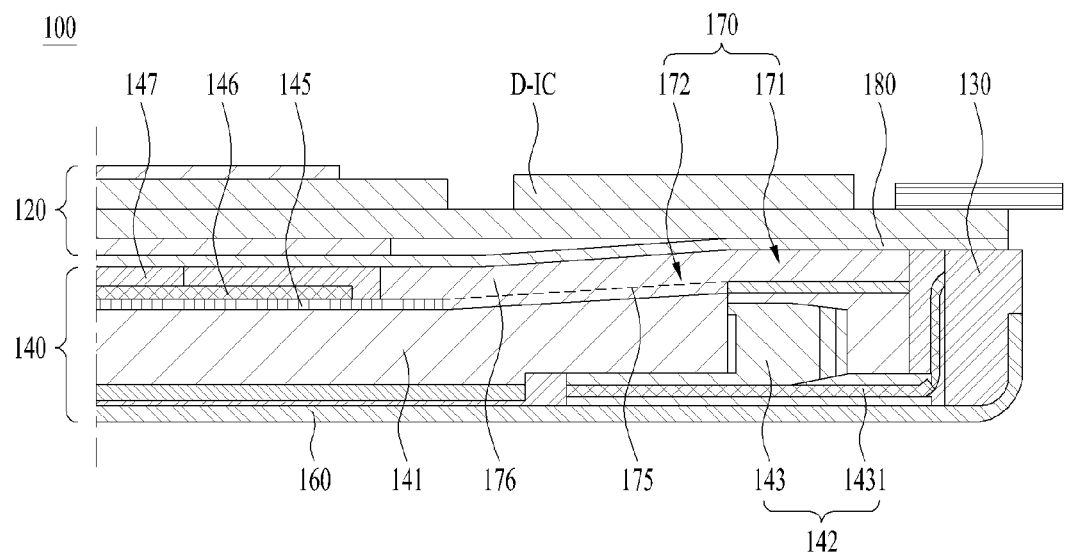
FIG. 2 is a sectional view of the display device shown in FIG. 1 according to an embodiment of the present disclosure.

FIG. 1 is an exploded perspective view showing a display device according to an embodiment of the present disclosure, and FIG. 2 is a sectional view of the display device shown in FIG. 1 according to an embodiment of the present disclosure.

Referring to FIGS. 1 and 2, a display device 100 according to an embodiment of the present disclosure includes a cover glass 110, a liquid crystal panel 120, a mold 130, a backlight unit 140, a flexible printed circuit board (FPCB) 150, a cover bottom 160, and a fixing unit 170.

A protective film (not shown) may be provided on the upper surface of the cover glass 110. The cover glass 110 may be provided with a touch panel (not shown). The touch panel may be of a resistive type, in which a series of sensors configured to react to pressure that is applied to the surface of the touch panel are arranged close together in order to determine the position of the touch panel to which pressure is applied as coordinates, or of a capacitive type, in which electric charges are charged on the surface of the cover glass 110 and sensors are arranged around the cover glass 110 such that the extent to which the electric charges are lost is sensed when the surface of the cover glass 110 is touched in order to determine the position of the cover glass 110 that is touched.

The liquid crystal panel 120, in which pixels are arranged in a matrix form in order to output an image, includes a color filter substrate 121 and an array substrate 122, which are laminated so as to be opposite each other such that a uniform cell gap is maintained there between, and a liquid crystal layer (not shown) formed in the cell gap between the color filter substrate 121 and the array substrate 122. A common electrode and a pixel electrode are formed in the liquid crystal panel 120, in which the color filter substrate 121 and the array substrate 122 are laminated, in order to apply an electric field to the liquid crystal layer. When voltage of a data signal applied to the pixel electrode is controlled in the state in which voltage is applied to the common electrode, liquid crystals in the liquid crystal layer are rotated based on dielectric anisotropy according to the electric field between the common electrode and the pixel electrode, whereby light is transmitted or blocked for individual pixels in order to display text or images.

In order to control the voltage of the data signal that is applied to the pixel electrode for each pixel, a switching element, such as a thin film transistor (TFT), is provided for each pixel.

That is, a gate line and a data line, which are arranged lengthwise and crosswise to define a pixel region, are formed in the array substrate 122. A switching element, such as a thin film transistor, is formed at the intersection between the gate line and the data line.

The thin film transistor includes a gate electrode connected to the gate line, a source electrode connected to the data line, and a drain electrode connected to the pixel electrode.

The color filter substrate 121 may include a color filter, which is constituted by a plurality of sub-color filters for realizing red, green, and blue colors (RGB), a black matrix for partitioning the sub-color filters from each other and for blocking light that is transmitted through the liquid crystal layer, and an overcoat layer formed on the color filter and the black matrix.

Polarization plates are attached to the outer surfaces of the color filter substrate 121 and the array substrate 122. A lower polarization plate polarizes light that has passed through the backlight unit 140 toward the array substrate 122, and an upper polarization plate polarizes light that has passed through the liquid crystal panel 120.

An OCR (optical clear resin) film 111 for increasing luminance is provided between the cover glass 110 and the liquid crystal panel 120. The lower edge of the liquid crystal panel 120 is supported by the mold 130, and the backlight unit 140 is accommodated in the mold 130.

The backlight unit 140 includes a light guide plate 141 disposed under the liquid crystal panel 120, a LED module 142 provided with a plurality of light sources 143 disposed at one side of the light guide plate 141 for emitting light, and a reflection plate provided on the rear surface of the light guide plate 141. The LED module 142 of the backlight unit 140 is disposed at one side of the light guide plate 141.

A plurality of optical sheets 144, for improving the efficiency of light that is emitted from the light guide plate 141 so as to be radiated to the liquid crystal panel 120, is provided on the upper surface of the light guide plate 141. However, the present disclosure is not limited thereto. Any kind of backlight unit 140 may be applied to the display device 100 according to the present invention.

The light guide plate 141 guides light emitted from the light sources 143 toward the liquid crystal panel 120. The light guide plate 141 may be made of plastic, such as PMMA or PC.

The reflection plate is located between the cover bottom 160 and the rear surface of the light guide plate 141. The reflection plate reflects light emitted from the light sources 143 and light reflected by the light guide plate 141 toward the liquid crystal panel 120. Light emitted from the light sources 143 is incident on the side surface of the light guide plate 141. The reflection plate, disposed on the rear surface of the light guide plate 141, reflects light transmitted to the rear surface of the light guide plate 141 toward the optical sheets 144, disposed on the upper surface of the light guide plate 141, in order to reduce the loss of light and to improve uniformity of luminance.

The optical sheets 144 may include a diffusion sheet 145 and a prism sheet 146, and may further include a luminance improvement film 147, such as DBEF, and a protection sheet (not shown). The optical sheets 144 may be provided between the upper surface of the light guide plate 141 and the rear surface of the liquid crystal panel 120. The backlight unit 140 having the above structure is accommodated in the cover bottom 160.

As shown in FIG. 2, a LED FPCB 1431 of the LED module is coupled to the cover bottom 160. When the LED FPCB 1431 is coupled to the cover bottom 160, heat generated from the light sources 143 is discharged to the outside, whereby heat dissipation efficiency is improved. In addition, heat generated from a driving IC (D-IC) provided in the liquid crystal panel 120 is prevented from being applied to a specific portion of the display device together with heat generated from the light sources 143.

Since the LED FPCB 1431 is coupled to the cover bottom 160, the fixing unit 170 is coupled to the portion of the display device at which the existing LED FPCB 1431 is located. The fixing unit 170 is attached to the upper surface of a light-incident part of the light guide plate 141, on which the light sources 143 are disposed. Consequently, it is possible to prevent light that has not passed through the upper surface, i.e. the liquid crystal panel 120, after being emitted from the light sources 143 from leaking to the outside.

The fixing unit 170 includes a first support region 171 for supporting the liquid crystal panel 120 above the light guide plate 141 and a second support region 172 for supporting the optical sheets 144. The first support region 171 and the second support region 172 may be integrally formed.

The fixing unit 170 further includes an adhesive member 175 attached to the upper surface of the light guide plate 141 and a reflection member 176 provided on the upper surface of the adhesive member 175 for reflecting light emitted from the light sources 143 back to the light guide plate 141. The reflection member 176 may have a color that exhibits high light reflectance, such as white, or may be made of a material that exhibits high light reflectance. As a result, a reduction in luminance around the light-incident part of the light guide plate is prevented, whereby image quality is improved.

Figure 3:
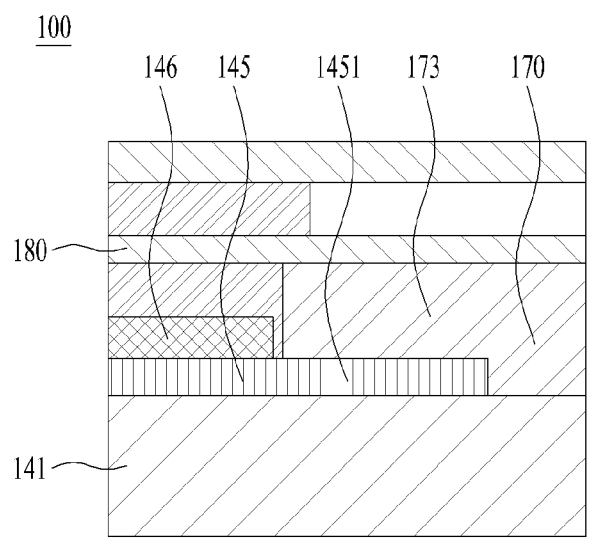
FIG. 3 is a partially enlarged reference view of the display device shown in FIG. 2 according to an embodiment of the present disclosure.
Figure 4:
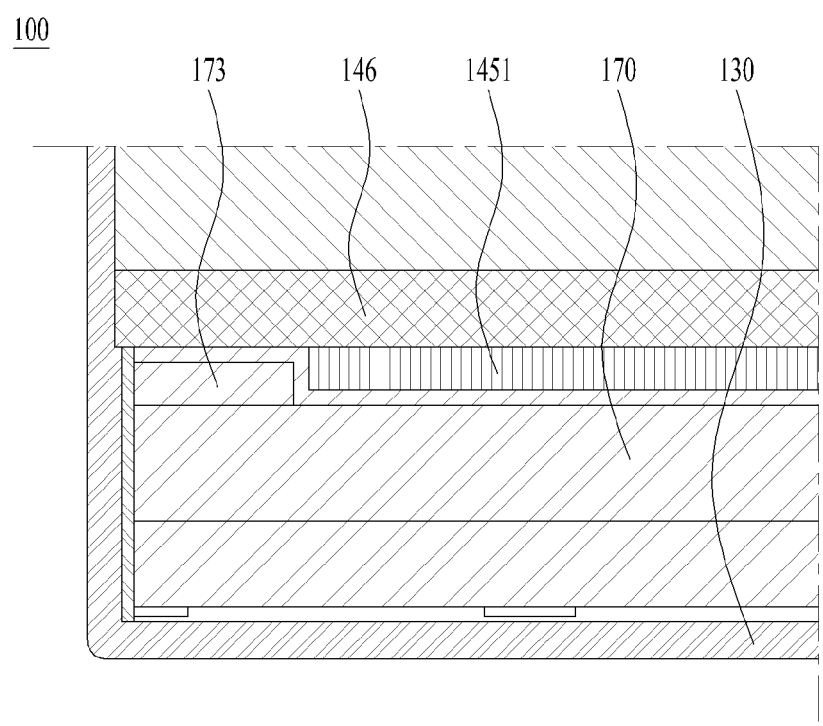
FIG. 4 is a plan view of the display device shown in FIG. 2 according to an embodiment of the present disclosure.

FIG. 3 is a partially enlarged reference view of the display device shown in FIG. 2, and FIG. 4 is a plan view of the display device shown in FIG. 2 according to one embodiment. In the following description, the same reference numerals as the above-mentioned reference numerals denote the same elements.

Referring to FIGS. 3 and 4, a light-shielding tape 180 for covering the backlight unit 140 is provided under the liquid crystal panel 120. The light-shielding tape 180 is attached to the mold 130, the fixing unit 170, and a portion of the outer region of the optical sheets 144. Consequently, the light-shielding tape 180 may simultaneously fix the optical sheets 144 and the fixing unit 170.

The fixing unit 170 includes protruding members 173 protruding from opposite ends of the second support region 172 toward the optical sheets 144.

The protruding members 173 may be attached so as to partially overlap the upper surfaces of opposite ends of the diffusion sheet 145, which is adjacent thereto. The diffusion sheet 145 includes extending members 1451 extending in the inward direction of the protruding members 173 of the fixing unit 170.

Consequently, the protruding members 173 and the extending members 1451 are disposed so as to interfere with each other in the horizontal direction, whereby the diffusion sheet 145 is prevented from being pushed by external force.

The side surface of each of the protruding members 173 may support a side surface of the prism sheet 146. When the diffusion sheet 145 is attached to the lower part of each of the protruding members 173 and the prism sheet 146 is supported by the side surface of each of the protruding members 173, therefore, the second support region 172 of the fixing unit serves as a stopper for the optical sheets 144.

In order to compensate for an empty space between the liquid crystal panel 120 and the light guide plate 141, the fixing unit may be made of at least one selected from the group consisting of polyethylene terephthalate (PET), polyethylene (PE), polypropylene (PP), polystyrene (PS), polycarbonate (PC), polyamide (PA), polystyrene, phenol resin, and epoxy resin. The above-specified materials exhibit high resistance to compressive or tensile stress, making it possible to minimize deformation of the empty space.

As is apparent from the above description, in the display device according to the present disclosure, the empty space between the liquid crystal panel and the backlight unit is compensated for, whereby the liquid crystal panel is more securely supported. In addition, heat generated from the LED module is efficiently dissipated to the outside, and the fixing unit reflects light emitted from the light sources back to the light guide plate, whereby image quality is improved.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A display device comprising:
    a liquid crystal panel comprising a color filter substrate and an array substrate attached with the color filter substrate;
    a backlight unit comprising an optical sheet including a prism sheet and a diffusion sheet that are disposed under the liquid crystal panel, a light guide plate disposed under the optical sheet, and a light emitting diode (LED) module provided with a light source disposed at one side of the light guide plate and a flexible printed circuit board disposed under the light source;
    a mold for supporting a lower part of the liquid crystal panel and accommodating the backlight unit;
    a cover bottom provided to cover a rear surface and a side surface of the backlight unit and the mold; and
    a fixing unit provided between the light guide plate and the liquid crystal panel, the fixing unit including:
        a first support region for supporting the liquid crystal panel above the light guide plate;
        a second support region extending integrally from the first support region for simultaneously supporting a side surface of the prism sheet, a side surface of the diffusion sheet, and an upper surface of the diffusion sheet; and
        protruding members protruding from opposite ends of the second support region toward the optical sheet, wherein the protruding members are disposed so as to partially overlap upper surfaces of opposite ends of the diffusion sheet.

2. The display device according to claim 1, wherein the diffusion sheet comprises extending members extending from regions thereof that do not overlap the protruding members toward the fixing unit.

3. The display device according to claim 2, wherein the protruding members and the extending members are disposed so as to overlap with each other in a horizontal direction.

4. A display device comprising:
    a liquid crystal panel comprising a color filter substrate and an array substrate attached with the color filter substrate;
    a backlight unit comprising an optical sheet including a prism sheet and a diffusion sheet that are disposed under the liquid crystal panel, a light guide plate disposed under the optical sheet, and a light emitting diode (LED) module provided with a light source disposed at one side of the light guide plate and a flexible printed circuit board disposed under the light source;
    a mold for supporting a lower part of the liquid crystal panel and accommodating the backlight unit;
    a cover bottom provided to cover a rear surface and a side surface of the backlight unit and the mold; and
    a fixing unit provided between the light guide plate and the liquid crystal panel for fixing the optical sheet, wherein the fixing unit comprises:

a first support region for supporting the liquid crystal panel above the light guide plate;

a second support region extending integrally from the first support region for simultaneously supporting a side surface of the prism sheet, a side surface of the diffusion sheet, and an upper surface of the diffusion sheet;

an adhesive member attached to an upper surface of the light guide plate; and a reflection member provided on an upper surface of the adhesive member for reflecting light emitted from the light source back to the light guide plate.

5. The display device according to claim 4, further comprising a light-shielding tape disposed between an upper surface of the fixing unit and the liquid crystal panel so as to be simultaneously attached to the reflection member, the mold, and a portion of the optical sheet.

\* \* \* \* \*